Jan. 19, 1965   J. CLIFFORD ETAL   3,166,690
CIRCUIT CONTROLLING DEVICES
Filed Oct. 12, 1960   3 Sheets-Sheet 1
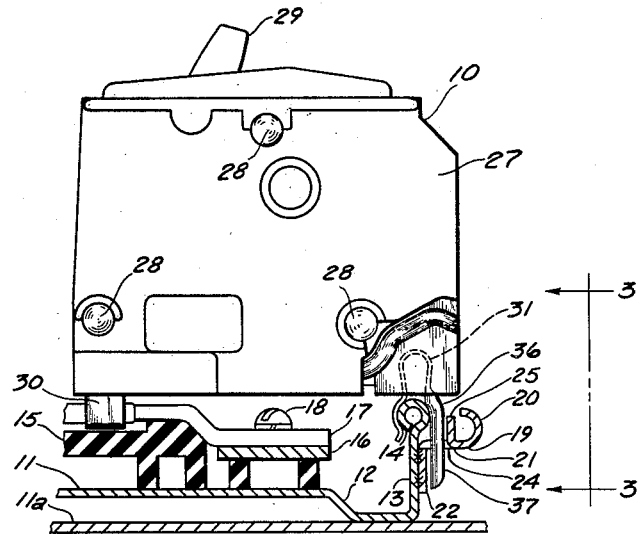
FIG. 1
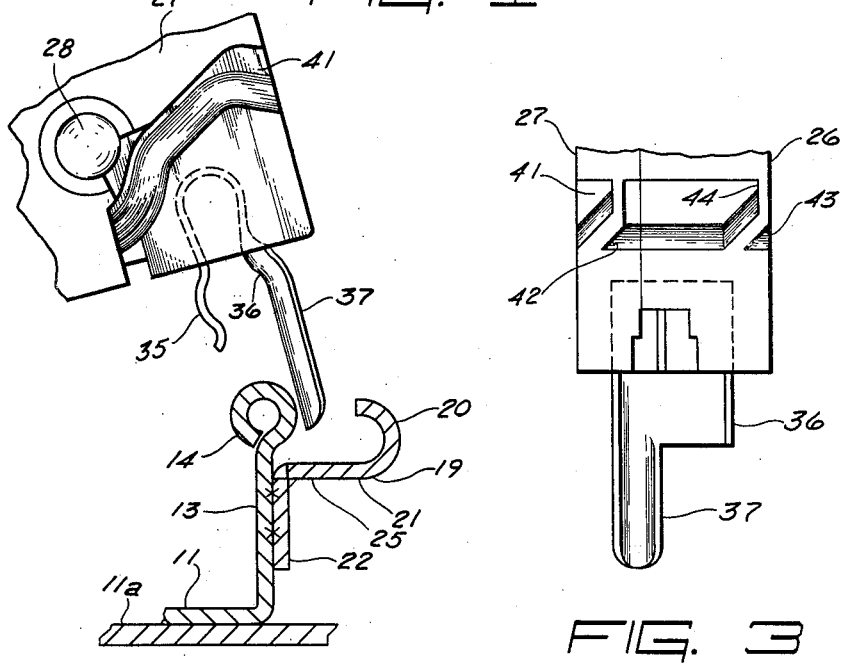
FIG. 2
FIG. 3
INVENTOR.
HARRIS I. STANBACK
FRANK KUSSY
JOSEPH CLIFFORD
BY Thomas F. Kirby Jan. 19, 1965  J. CLIFFORD ETAL  3,166,690
CIRCUIT CONTROLLING DEVICES
Filed Oct. 12, 1960  3 Sheets-Sheet 2
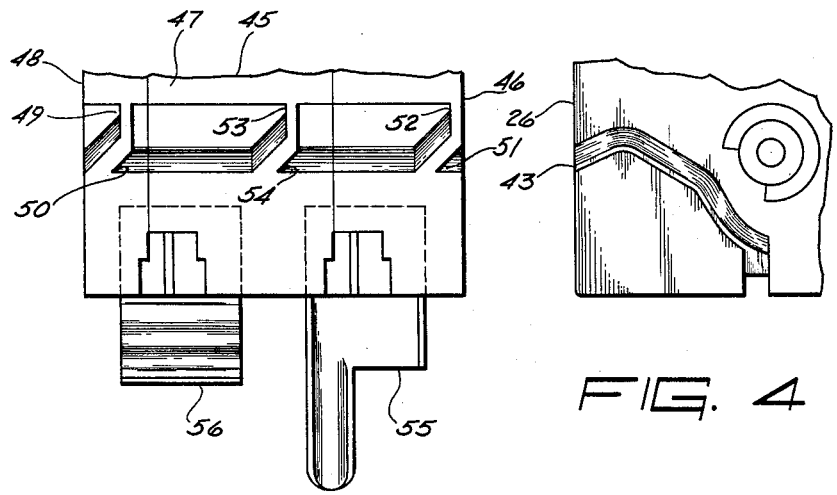
FIG. 4
FIG. 7
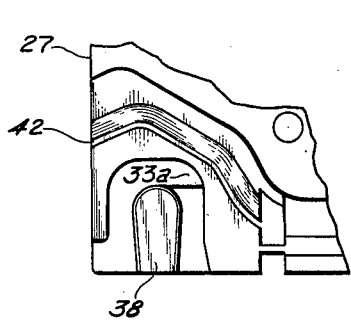
FIG. 5
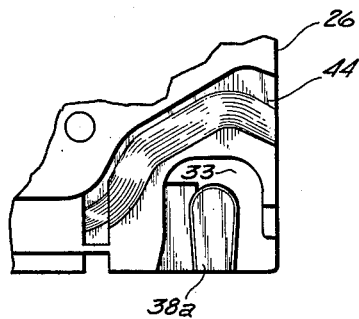
FIG. 6
INVENTOR.
HARRIS I. STANBACK
FRANK KUSSY
JOSEPH CLIFFORD
BY Thomas F. Kirby Jan. 19, 1965   J. CLIFFORD ETAL   3,166,690
CIRCUIT CONTROLLING DEVICES
Filed Oct. 12, 1960   3 Sheets-Sheet 3

INVENTOR.
HARRIS I. STANBACK
FRANK KUSSY
JOSEPH CLIFFORD
BY Thomas F. Kirby

United States Patent Office 3,166,690
Patented Jan. 19, 1965

3,166,690
CIRCUIT CONTROLLING DEVICES
Joseph Clifford, Cedar Rapids, Iowa, Frank Kussy, Birmingham, Mich., and Harris I. Stanback, Lexington, Ky., assignors to Square D Company, Park Ridge, Ill., a corporation of Michigan
Filed Oct. 12, 1960, Ser. No. 62,124
7 Claims. (Cl. 317—119)

This invention relates generally to electric circuit controlling devices having rejection means which restrict their interchangeability on a mounting panel assembly. More particularly, it relates to electric circuit breakers having means for rendering such circuit breakers non-attachable to a mounting panel assembly when efforts are made to tamper with the said rejection means to defeat the non-interchangeability function thereof.

Electrical safety codes require that molded case type circuit breakers be constructed so that those of certain electrical ratings cannot readily be replaced by those of higher electrical ratings on a mounting panel assembly. Accordingly, some circuit breakers are being equipped with so-called rejection or non-interchangeability means, devices or members which have configurations determined in accordance with the electrical rating of the particular circuit breaker on which they are employed. In some instances, the so-called rejection means are incorporated in a non-energizable portion of the circuit breaker which mechanically secures the circuit breaker to the mounting panel assembly. In other instances, the such means are incorporated in an energizable portion of the circuit breaker which is both mechanically and electrically connectible to an energizable member on the mounting panel assembly. In either event, such circuit breakers are intended to be employed on mounting panel assemblies wherein each individual mounting location is adapted to accept circuit breakers of predetermined rating and to reject others. Due to structural peculiarities, it is sometimes possible to tamper with the rejection means on the circuit breakers or with the means on the panel assemblies with which such rejection means normally cooperate and to alter the configuration thereof, thereby enabling a circuit breaker to be attached on a panel assembly at a location where it is not supposed to be attached. It is desirable, therefore, that circuit breakers and panelboards therefor be constructed so that such tampering is discouraged or effectively prevented.

It is an object of this invention to provide improved circuit controlling devices and mounting panel assemblies therefor having rejection or non-interchangeability means which, if tampered with to alter the configuration thereof, effectively prevent proper association of the circuit breakers with the mounting panel assemblies.

Another object is to provide improved circuit controlling devices having attachment means which are integral with the rejection or non-interchangeability means and are adapted so as to be rendered useless for attachment purposes if serious attempts are made to alter the configuration of the rejection means thereof.

Another object is to provide improved molded case type circuit breakers having cases which have attachment means thereon for supporting the circuit breakers on mounting panel assemblies in predetermined locations, said attachment means being adapted to become disassociated from, or improperly associated with, said cases if serious attempts are made to bend, break or otherwise alter the configuration of the said attachment means to defeat their non-interchangeability function.

A more specific object is to provide an improved molded case type circuit breaker having a case which is adapted to break to disassociate its attachment means therefrom if an attempt is made to exert force to alter the configuration of said attachment means, said means also serving as the non-interchangeability means on said circuit breaker.

Another object is to provide improved single pole and mutliple circuit breakers of the aforesaid character.

Another object is to provide improved circuit breakers of the aforesaid character wherein said rejection or non-interchangeability means is incorporated either in energizable or non-energizable portions of the circuit breakers.

Other objects and advantages of the invention will hereinafter appear.

The accompanying drawings illustrate several preferred embodiments of the invention, it being understood that the embodiments illustrated are susceptible of modification with respect to details thereof without departing from the scope of the appended claims.

In the drawings:

FIG. 1 is an elevational view, partly in section, depicting the invention embodied in a single pole molded case circuit breaker which is mounted on a mounting panel assembly, the non-interchangeability means of the circuit breaker being incorporated in a non-energizable fastening device which mechanically engages the mounting panel assembly.

FIG. 2 is an enlarged elevational view, partly in section, of portions of the circuit breaker and mounting panel assembly shown in FIG. 1, showing another portion of the latter in interfering relationship with the circuit breaker.

FIG. 3 is is an enlarged elevational view of the end of the circuit breaker shown in FIGS. 1 and 2, taken along the line 3—3 of FIG. 1.

FIG. 4 is an enlarged elevational view of a portion of the opposite side of the circuit breaker shown in FIGS. 1 through 3.

FIG. 5 is an enlarged elevational view of a portion of the inner side of the cover of the circuit breaker shown in FIGS. 1 through 3.

FIG. 6 is an enlarged elevational view of a portion of the inner side of the body portions of the circuit breaker shown in FIGS. 1 through 3.

FIG. 7 is an enlarged elevational view of the end of a two-pole molded case circuit breaker incorporating the invention, the non-interchangeability means of the circuit breaker being incorporated in one of the non-energizable fastening devices which mechanically engage a mounting panel assembly similar to that shown in FIGS. 1 and 2.

Figure 8:
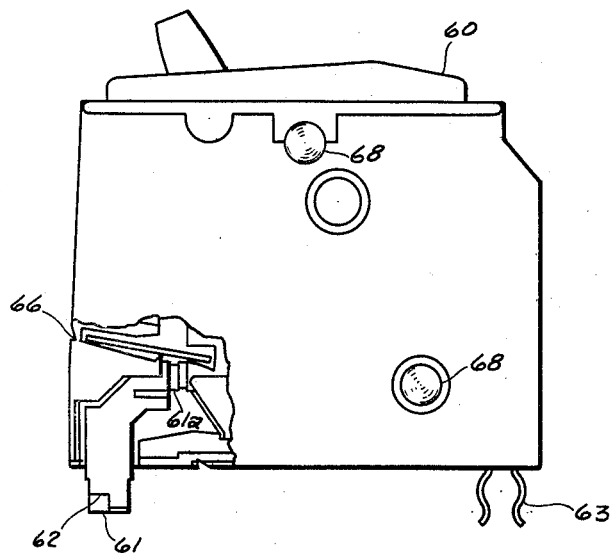
FIG. 8 is an elevational view, partly broken away, depicting the invention embodied in a single pole molded case circuit breaker wherein the non-interchangeability means of the circuit breaker is incorporated in the energizable terminal connector which mechanically and electrically connects the circuit breaker to a mounting panel assembly.

Referring to FIG. 1, a single pole molded case circuit breaker 10 is shown mounted upon a portion of a mounting panel assembly 11 which is secured to a rear wall 11a of an enclosure box (not shown) by means not shown. The circuit breaker 10 and the panel assembly 11 incorporate non-interchangeability features which are disclosed with greater particularity in patent application Serial No. 806,587 now Patent No. 3,065,386 filed April 15, 1959, by King and Stanback and assigned to the same assignee as the present invention and reference may be had to that application for a more detailed description of their construction.

The mounting panel assembly 11 comprises a sheet metal pan 12 having a side edge which is bent to form a flange 13 which terminates in a rolled-over bead portion 14 which serves as a supporting element for the circuit breaker 10. An insulating support 15 is rigidly secured to the pan 12 by suitable means (not shown) and an electrically conductive bus bar 16 is rigidly secured by suitable means (not shown) to the support 15. A terminal connector 17 is electrically and mechanically connected as by the screw 18 to the bus bar 16.

In accordance with non-interchangeability requirements, a rejection channel member 19, shown in FIGS. 1 and 2, is rigidly secured, as by welding, to the outermost side of the flange 13 of the pan 12 of the mounting panel assembly 11. The channel member 19, which will be understood to be an elongated member, comprises a curbed edge 20, a flat portion 21 and a depending portion 22. As FIGS. 1 and 2 make clear, the flat portion 21 of the channel member 19 is provided at each circuit breaker mounting position therealong with a punched tab 25 which can be upwardly bent by an appropriate tool (not shown) to provide an aperture 24, shown in FIG. 1, for accommodating a spade-like portion 37 of a spring clip device 31 on the circuit breaker 10, hereinafter more particularly described. As FIG. 2 shows, if the tab 25 is not bent up, it interferes with the spade-like portion 37 of the spring clip device 31 of the circuit breaker 10 and thus prevents proper attachment of the circuit breaker to the mounting panel assembly 11.

Referring to FIGS. 1, 2 and 3, the circuit breaker 10 comprises a case formed from a base member 26 and a cover member 27 therefor, both of which are molded from suitable insulating material and are secured together by the rivets 28. The base 26 and the cover 27 are provided with suitable openings which accommodate an operating handle 29, an electrically conductive spring jaw clip 30 which electrically and mechanically engages the terminal connector 17 on the mounting panel assembly 11, and a non-conductive spring clip device 31.

As FIGS. 1, 2 and 3 make clear, the spring clip device 31, which is attached to the circuit breaker 10 by entrapment as will appear, is preferably fabricated from heavy gauge spring steel and comprises a U-shaped bight portion from which the spaced-apart jaws 35 and 36 depend, the latter being adapted to engage the rolled-over bead portion 14 of the flange 13 of the pan 12 of the mounting panel assembly 11 therebetween to support the end of the circuit breaker on the mounting panel assembly. FIGS. 5 and 6 show that the inner sides of the cover 27 and the base 26 respectively, are provided with U-shaped recesses 33a and 33, respectively, which surround the molded projections 38 and 38a, respectively, and the recesses are adapted to accommodate the bight portion of the spring clip device 31 when the base 26 and the cover 27 are secured together. If preferred, the projections 38 and 38a in the cover 27 and the base 26 could be replaced by a rivet (not shown) supported by the base and cover and such a rivet would retain the spring clip device 31 in position.

In accordance with non-interchageability requirements, the outer jaw 36 of the spring clip device 31 is provided with a spade-like extension 37 which cooperates with the rejection channel member 19 of the mounting panel assembly 11, as hereinbefore explained.

FIGS. 1, 2, 3 and 5 show that in accordance with the invention the exterior and interior surfaces of the cover 27 of the case of the circuit breaker 10 are scored or provided with complementary molded grooves such as 41 and 42 respectively, which define a boundary between the corner of the cover whereat the recess 33a is located and the remainder of the cover. The grooves 41 and 42 are sufficiently deep and disposed with respect to each other so as to weaken the cover 27 therealong, thus enabling the cover to break therealong if undue bending or twisting force is applied to the corner of the cover bounded by the grooves. The thickness of the molded material between the grooves 41 and 42 should be sufficient so as to enable the spring clip device 31 to be afforded adequate support under normal conditions of use. In a preferred embodiment, for example, where the cover 27 was fabricated or "Bakelite," reduction of the thickness of the material to about .031 inch between the grooves 41 and 42 in the cover 27 was sufficient to meet the aforesaid requirements of strength and frangibility.

FIGS. 3, 4 and 6 show that in accordance with the invention the exterior and interior surfaces of the base 26 of the case of the circuit breaker 10 is also scored or provided with the grooves 43 and 44 which are substantially identical to the grooves 41 and 42 hereinbefore described in configuration, disposition and purpose.

Thus, if an attempt is made to render the circuit breaker 10 attachable at a position such as illustrated in FIG. 2 by removing, bending or otherwise modifying the spade-like extension 37 on the outer jaw 36 of the spring clip device 31, as by bending, sawing or twisting, severe stresses and forces are exerted on the spring jaw device 31 and are transmitted through the bight portion thereof to the mating projections 38 and 38a and to the inside walls of the recesses 33 and 33a of the base 26 and cover 27 which entrap the spring jaw device 31. If these stresses and forces are of sufficient magnitude, and they normally would be if a serious attempt were being made to alter the configuration of the heavy gauge, tough spring steel clip 31, the base 26 and cover 27, or either of them, crack or break away around the grooves hereinbefore described and the spring clip device 31, if it does not become entirely disassociated from the circuit breaker 10, is rendered unable to support the end of the circuit breaker properly on the mounting panel assembly 11. In effect, the circuit breaker 10 is rendered useless since it cannot properly be employed at any position on the panel assembly. Thus, the invention effectively discourages or prevents tampering with the rejection device thereon to alter its configuration with a view toward defeating its non-interchangeability feature.

FIG. 7 depicts the invention embodied in a two pole circuit breaker 45 which may be assumed to have two circuit breaker mechanisms (not shown) therewithin and which comprises a base 46, an intermediate wall 47 and a cover 48, all of which are understood to be secured together by rivets (not shown). In accordance with modern mass production techniques, the base 46 and the cover 48 are identical in all respects to the base 26 and the cover 27, hereinbefore described, and are provided, respectively, with the grooves 51 and 52 and the grooves 49 and 50 in accordance with the invention. It is to be understood that the intermediate wall 47 is molded so that the configuration of the portions of its left and right sides (with respect to FIG. 7), respectively, are identical to the portions of the base 26 shown in FIG. 6 and to the portions of the cover 27 shown in FIG. 5. Thus, the intermediate wall 47 is provided with the grooves 53 and 54. The circuit breaker 47 is provided with a spring clip device 55, identical in form and function to the spring clip device 31 hereinbefore described, and with a spring clip device 56 which is not provided with a spade-like projection but which merely serves to assist in securing the circuit breaker to the mounting panel assembly. If preferred, the spring clip devices 55 and 56 could be interchanged on the circuit breaker provided that the rejection means on the mounting panel assembly were modified accordingly.

If undue stresses are applied to the spring clip devices 56 of the circuit breaker 45 to alter the configuration thereof to defeat its non-interchangeability function, the base 46 breaks along the grooves 51 and 52 and the intermediate wall 47 breaks along the grooves 53 and 54 to disassociate the spring clip device 56 from the circuit breaker. Since the intermediate wall 47 breaks along its grooves 53 and 54, it is apparent that the spring clip device 56 also becomes disassociated from the circuit breaker 47.

Although FIG. 7 shows the invention embodied in a two pole circuit breaker, it is apparent that it can be employed in circuit breakers having a greater number of poles which employed the stacked casing concept hereinbefore described.

Figure 10:
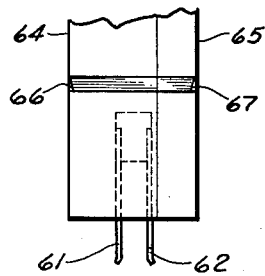
FIG. 10 is an elevational view of a portion of the end of the circuit breaker shown in FIGS. 8 and 9.
Figure 9:
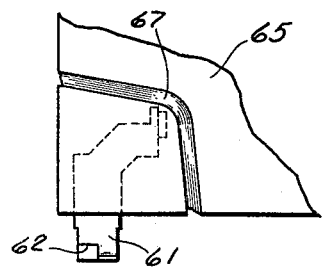
FIG. 9 is an elevational view of a portion of the circuit breaker shown in FIG. 8 showing the broken away portion in place.

FIGS. 8, 9 and 10 depict the invention embodied in a single pole circuit breaker 60 wherein the rejection means or non-interchangeability means is incorporated in the electrically conductive spring jaw clip 61 of the circuit breaker rather than in the non-conductive spring clip device, as was the case with the circuit breaker 10 hereinbefore described. The spring jaw clip 61 affords support for the stationary contact 61a of the circuit breaker 60. Since particular non-interchangeability systems form no part of this invention, the non-interchangeability feature is indicated generally by a notch 62 provided in the spring jaw clip 61, although it will be apparent that various other modifications could be provided. The circuit breaker 60 is provided with a spring clip device 63 for attachment to a mounting panel assembly (not shown) which could be similar to that hereinbefore described. The circuit breaker 60 comprises a base 64 and a cover 65, both fabricated of molded insulating material, which are secured together by the rivets 68.

In accordance with the invention, the base 64 and the cover 65 are scored or provided with grooves 66 and 67, respectively, as FIGS. 9 and 10 make clear. The grooves 66 and 67 tend to weaken those portions of the circuit breaker base 64 and cover 65 which afford mechanical support for the electrically conductive spring jaw clip 61. Thus, if serious efforts are made to alter the configuration of the spring jaw clip 61 to defeat its non-interchangeability function, as by bending, sawing or twisting, forces are transmitted to the supporting portions of the case 64 and cover 65 causing those members to crack along the grooves 66 and 67, respectively, and the clip 61 becomes disassociated from the circuit breaker 60 thus rendering the circuit breaker useless and non-attachable to any position on the mounting panel assembly.

It will be apparent to those skilled in the art that the invention disclosed herein may be employed in circuit breakers or other circuit controlling devices wherein the rejection or non-interchangeability means are integral with some portion of the housing, provided such portion also affords means whereby the device is mechanically secured to the mounting panel assembly.

What is claimed is:
1. A circuit breaker comprising:
(a) a molded case having a clip retaining portion,
(b) a mounting clip held in said clip retaining portion and projecting therefrom, and
(c) a groove in said case weakening said case adjacent said clip retaining portion, whereby attempted alteration of the configuration of said mounting clip ruptures said case at said groove.
2. A circuit breaker as claimed in claim 1, wherein said mounting clip includes a jaw having an extension thereon and said extension is generally channel-shaped to increase the stiffness thereof.
3. A molded-case circuit breaker comprising:
(a) a main case portion for enclosing a circuit breaker mechanism,
(b) a clip retaining case portion having a mounting clip held therein and projecting therefrom, and
(c) connecting case portions joining said clip retaining case portion and said main case portion, said connecting case portions being thinner than said main case portion and said clip retaining case portion and the force required to alter the configuration of said mounting clip being greater than the force required to rupture the case of said circuit breaker at said connecting case portions, whereby said case ruptures at said connecting portions upon attempted alteration of the configuration of said mounting clip.
4. A circuit breaker as claimed in claim 3, wherein said mounting clip includes a jaw having an extension thereon and said extension is generally channel-shaped to increase the stiffness thereof.
5. A molded-case circuit breaker comprising:
(a) a molded-case including a base member and a cover member each having a clip retaining portion in cooperative association with the clip retaining portion of the other, and
(b) a mounting clip held in said clip retaining portions and projecting therefrom, each of said members having a groove therein defining the clip retaining portion thereof and weakening said case thereat and the force required to alter the configuration of said mounting clip being greater than the force required to rupture the case of said circuit breaker at said grooves, whereby attempted alteration of the configuration of said mounting clip ruptures said case at the grooves in said members.
6. A circuit breaker as claimed in claim 5, wherein said base member and cover member are held together by rivets, including a rivet adjacent said grooves on the other side thereof from said clip retaining portions of said members.
7. A circuit breaker as claimed in claim 5 wherein said mounting clip includes a jaw having an extension thereon and said extension is generally channel-shaped to increase the stiffness thereof.

References Cited in the file of this patent
UNITED STATES PATENTS

| | | |
|---|---|---|
| 2,916,675 | Middendorf | Dec. 8, 1959 |
| 2,942,302 | Beyer | June 28, 1960 |
| 3,065,386 | King et al. | Nov. 20, 1962 |
| 3,120,629 | Davis | Feb. 4, 1964 |